United States Patent [19]
Fu

[11] Patent Number: 6,145,882
[45] Date of Patent: Nov. 14, 2000

[54] ALBUM AND FABRICATION PROCESS

[75] Inventor: David Fu, Rowland Heights, Calif.

[73] Assignee: Rembrandt Photo Services, City of Commerce, Calif.

[21] Appl. No.: 09/461,166

[22] Filed: Dec. 14, 1999

Related U.S. Application Data

[60] Provisional application No. 60/120,397, Feb. 17, 1999.
[51] Int. Cl.[7] .............................. B42F 5/00; B42D 1/00; B42C 7/00; B31F 1/00; B32B 31/00
[52] U.S. Cl. .......................... 281/22; 281/38; 281/21.1; 281/15.1; 412/3; 412/5; 412/8; 156/201; 156/290
[58] Field of Search .............................. 281/38, 22, 21.1, 281/15.1, 28; 402/79; 412/3, 5, 8; 156/73.1, 73.4, 201, 252, 290, 308.4

[56] References Cited

U.S. PATENT DOCUMENTS

| | | |
|---|---|---|
| 2,558,996 | 7/1951 | Ullmann ..................... 281/15 |
| 2,732,875 | 1/1956 | Martin . |
| 2,815,126 | 12/1957 | Deckers . |
| 2,828,975 | 4/1958 | Wright . |
| 2,850,294 | 9/1958 | Ortis et al. . |
| 2,878,850 | 3/1959 | Quint . |
| 2,914,318 | 11/1959 | Mc Garvey et al. . |
| 3,116,738 | 1/1964 | Wentges . |
| 3,159,411 | 12/1964 | McKowen . |
| 3,167,328 | 1/1965 | Dengle et al. . |
| 3,560,290 | 2/1971 | Sendor et al. ............... 156/227 |
| 3,797,146 | 3/1974 | Holes . |
| 4,243,459 | 1/1981 | Lawes . |
| 4,265,954 | 5/1981 | Romanek ................... 156/72 |
| 4,326,906 | 4/1982 | Cross ........................ 156/201 |
| 4,355,822 | 10/1982 | McHugh . |
| 4,430,288 | 2/1984 | Bonis . |
| 4,492,390 | 1/1985 | Jacobs et al. . |
| 4,547,000 | 10/1985 | Sallinen . |
| 4,596,408 | 6/1986 | Carter et al. . |
| 4,659,109 | 4/1987 | Donovan . |
| 4,748,070 | 5/1988 | Beehler ...................... 156/290 |
| 4,844,508 | 7/1989 | Choi . |
| 4,886,299 | 12/1989 | Ducorday ................... 281/31 |
| 4,954,393 | 9/1990 | Jones . |
| 4,958,855 | 9/1990 | Shipp . |
| 5,002,447 | 3/1991 | Borel ......................... 412/6 |
| 5,040,216 | 8/1991 | Policht . |
| 5,183,296 | 2/1993 | Policht . |
| 5,277,445 | 1/1994 | Yamagata .................. 281/15.1 |
| 5,312,507 | 5/1994 | Miller ........................ 156/290 |
| 5,360,234 | 11/1994 | Miller et al. . |
| 5,447,333 | 9/1995 | Kuhns et al. ............... 281/29 |
| 6,009,925 | 1/2000 | Hall et al. .................. 156/358 |
| 6,061,943 | 5/2000 | Pepys ........................ 40/771 |

FOREIGN PATENT DOCUMENTS

119324  12/1944  Australia .

Primary Examiner—A. L. Wellington
Assistant Examiner—Alisa L. Thurston
Attorney, Agent, or Firm—David Weiss

[57] ABSTRACT

An album for containing items such as photographs or collectible cards, and its fabrication process, combining the advantages of a cover of one thermoplastic material with the different advantages of leaves of another thermoplastic material weld-incompatible with the cover material, using thermoplastic welding for securing the leaves to the cover. In its preferred embodiment, the album comprises a cover having vinyl inner and outer cover sheets secured to one another in superposed relation with a polypropylene sheet captured therebetween and extending along the cover's spine, and a plurality of polypropylene leaves thermally welded to the captured polypropylene sheet along the cover's spine and through the inner cover.

23 Claims, 5 Drawing Sheets

ALBUM AND FABRICATION PROCESS

CROSS REFERENCE TO RELATED APPLICATION

This application claims the benefit of U.S. Provisional Application No. 60/120,397, filed Feb. 17, 1999, which application is incorporated herein by reference.

BACKGROUND OF THE INVENTION

This invention relates to albums for containing photographs and other sheet materials such as collectible cards, and in particular to such albums having covers and leaves of thermoplastic materials that are weld-incompatible, and to the process for fabricating such albums.

A popular type of photograph album includes an album cover comprising or covered with a thermoplastic material, and further includes a plurality of sleeved leaves or pages of a clear thermoplastic material. The cover and the leaves may be of the same type of thermoplastic material, for example vinyl (polyvinyl chloride or PVC) cover and leaf material, or polypropylene cover and leaf material, and the fabrication process includes heat welding the leaves to the spine of the album cover by conventional thermoplastic welding processes.

Vinyl is a versatile material for use as album covers; for example, vinyl adapts to various decorating and embossing techniques for creating a variety of surface textures and aesthetic effects. However, vinyl is generally considered to have certain limitations in its utilization as a material for sleeved leaves for containing photographs or collectible cards. For utilization as album leaves, polypropylene has certain advantages over vinyl. Polypropylene is substantially chemically inert and will generally not react with dyes and other surface components of photographs and collectible cards, and is physically resistant to extreme heat and cold. Unlike vinyl, polypropylene is highly suitable for archival applications, and polypropylene leaves having pockets for containing photographs or cards are particularly suitable for the long-term storage of such contents.

Although vinyl sheets can be heat welded to other vinyl sheets, and polypropylene sheets can be heat welded to other polypropylene sheets, vinyl and polypropylene are incompatible materials for being heat welded to one another; i.e. polypropylene sheet material cannot reliably be thermally welded to vinyl sheet material.

SUMMARY OF THE INVENTION

The present invention provides an album that combines the advantages of a cover of one thermoplastic material with the different advantages of leaves of another thermoplastic material weld-incompatible with the cover material, using thermoplastic welding for securing the leaves to the cover. The invention finds particular application in the fabrication of an album for containing photographs or collectible cards, combining the esthetic advantages of a vinyl cover with the archival advantages of polypropylene leaves, using thermal welding for securing the polypropylene leaves to the vinyl cover.

Briefly described, the album according to the present invention comprises: an inner cover sheet of a thermoplastic material and an outer cover sheet of a thermoplastic material secured to one another in superposed relation to form a cover having a spine; a plurality of leaves of a thermoplastic material weld-incompatible with the thermoplastic materials of the inner cover sheet and the outer cover sheet; and an intermediate sheet of a thermoplastic material weld-compatible with the second thermoplastic material of the leaves, the intermediate sheet retained between the inner cover sheet and the outer cover sheet and extending along the spine, the leaves thermally welded to the intermediate sheet along the spine and through the inner cover sheet. In a preferred embodiment of the album, the thermoplastic materials of the inner cover sheet and the outer cover sheet are vinyl, while the thermoplastic materials of the leaves and the intermediate sheet are polypropylene.

In one embodiment of the album, the intermediate sheet comprises a polypropylene strip, preferably flexible, longitudinally extending along the album cover's spine, and the polypropylene leaves are thermally welded to the strip through at least one opening in the inner cover along the spine. Preferably, the cover includes a first rigid panel (such as chipboard) disposed between the inner cover sheet and the outer cover sheet on one side of the spine and a second rigid panel (such as chipboard) disposed between the inner cover sheet and the outer sheet on the other side of the spine, the flexible strip having longitudinal edge portions disposed or captured between portions of the panels and the outer cover sheet.

In another album embodiment, the intermediate sheet comprises a rigid polypropylene panel foldable along the spine of the vinyl-covered cover, and the polypropylene leaves are welded to the rigid polypropylene panel along the spine.

The process for fabricating the album according to the present invention comprises: (a) providing an album cover comprising an inner cover sheet of a thermoplastic material and an outer cover sheet of a thermoplastic material secured to one another in superposed relation forming a front cover and a rear cover separated by a spine, the album cover including an intermediate sheet of a thermoplastic material weld-incompatible with the thermoplastic materials of the inner cover sheet and the outer cover sheet, the intermediate sheet retained between the inner cover sheet and the outer cover sheet and extending along the spine; (b) providing a plurality of leaves of a thermoplastic material weld-compatible with the thermoplastic material of the intermediate sheet; and (c) thermally welding the leaves to the intermediate sheet along the spine and through the inner cover sheet. In step (a) the thermoplastic materials of the inner cover sheet and the outer cover sheet are preferably vinyl and the thermoplastic material of the intermediate sheet is preferably polypropylene; and in step (b) the thermoplastic material of the leaves is preferably polypropylene.

According to one preferred process embodiment, in step (a) the intermediate sheet is a polypropylene strip longitudinally extending along the cover's spine and the provided album cover further includes a first rigid panel (such as chipboard) disposed between the inner cover sheet and the outer cover sheet on one side of the spine and a second rigid panel (such as chipboard) disposed between the inner cover sheet and the outer cover sheet on the other side of the spine, the polypropylene strip being flexible and having longitudinal edge portions disposed between portions of the panels and the outer cover sheet. During step (c), the polypropylene leaves are welded to the polypropylene strip through at least one opening in the vinyl inner cover sheet along the spine, and preferably the polypropylene leaves are welded to the strip through apertures burned through the vinyl inner cover sheet spaced along the spine.

According to another preferred process embodiment, in step (a) the intermediate sheet comprises a rigid polypropylene panel within the first and second vinyl-covered covers and foldable along the cover's spine, and in step (c) the polypropylene leaves are thermally welded to the rigid polypropylene panel through at least one opening in the vinyl inner cover sheet along the spine, and preferably through apertures burned through the vinyl inner cover sheet spaced along the spine.

BRIEF DESCRIPTION OF THE DRAWINGS

The novel features which are believed to be characteristic of the invention, together with further advantages thereof, will be better understood from the following description considered in connection with the accompanying drawings in which preferred embodiments of the present invention are illustrated by way of example. It is to be expressly understood, however, that the drawings are for the purpose of illustration and description only and are not intended as a definition of the limits of the invention.

FIG. 9 is a fragmentary cross-sectional view of a variation of the cover shown in FIG. 8a;

DETAILED DESCRIPTION OF THE PREFERRED EMBODIMENT

Figure 1:
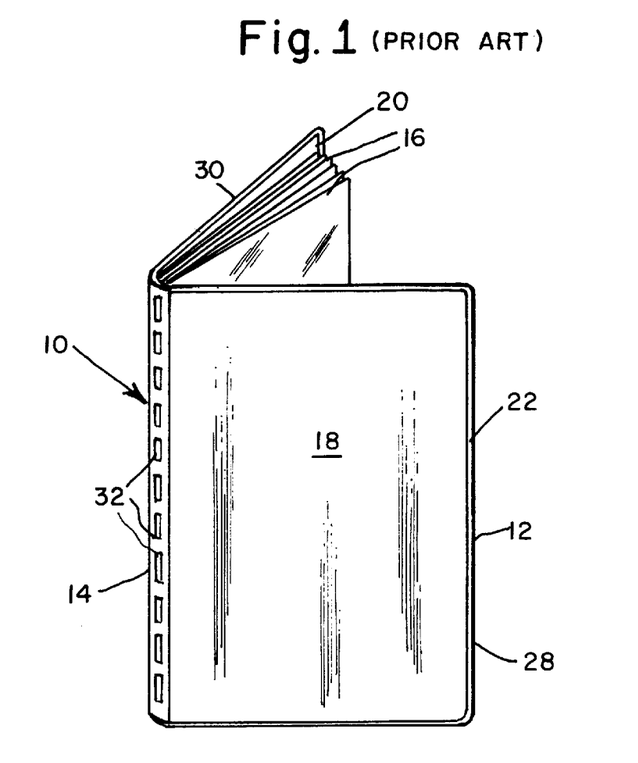
FIG. 1 is an elevation perspective view of a typical prior art photo album having covers and leaves of thermoplastic material that are weld compatible.
Figure 2:
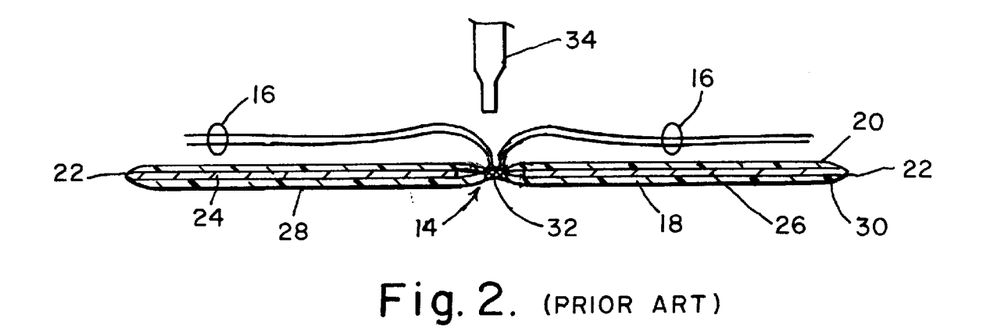
FIG. 2 is a cross-sectional view of the photo album of FIG. 1, in open configuration.

Turning first to FIGS. 1 and 2, a prior art photo album 10 is shown of the type that includes a cover 12 covered with a thermoplastic material, a spine 14, and a plurality of pages or leaves of a thermoplastic material thermally welded to the thermoplastic cover material along the cover's spine 14. Each page or leaf 16 is a transparent sleeve for containing a photographic print, and both the material of the album cover 12 and the material of the leaves 16 are the same type of material, such as either vinyl (polyvinyl chloride or PVC) or polypropylene.

The prior art photo album 10 includes a flexible vinyl outer cover sheet 18 and a flexible vinyl inner cover sheet or liner 20 secured together along their edges by a weld or heat seal 22, with two rectangular rigid (typically chipboard) panels 24, 26 between the outer cover sheet 18 and the inner liner 20 forming a front cover 28 and a rear cover 30. The vinyl leaves 16 are welded to the vinyl inner liner 20 and the vinyl outer cover sheet 18, producing a weld or welds 32 along the album's spine 14, using appropriate thermoplastic welding methods. One such method is ultrasonic welding, in which the vinyl is heated by molecular vibration in the vinyl material induced by applying ultrasonic energy between the vinyl sheets 16, 20, 24, as supplied by an ultrasonic "horn" 34 which also applies pressure to the vinyl sheets when brought into contact with the uppermost vinyl sheet or leaf (the lower anvil of the ultrasonic equipment not being shown in the drawing). Other types of thermoplastic welding are often used with vinyl, such as radio frequency welding.

Figure 3:
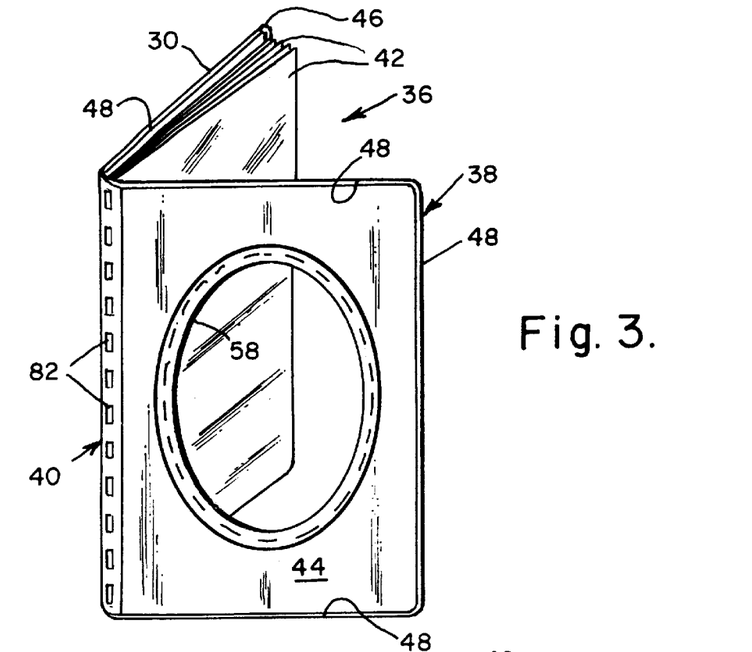
FIG. 3 is an elevation perspective view of a preferred embodiment of a photo album in accordance with the present invention.
Figure 4:
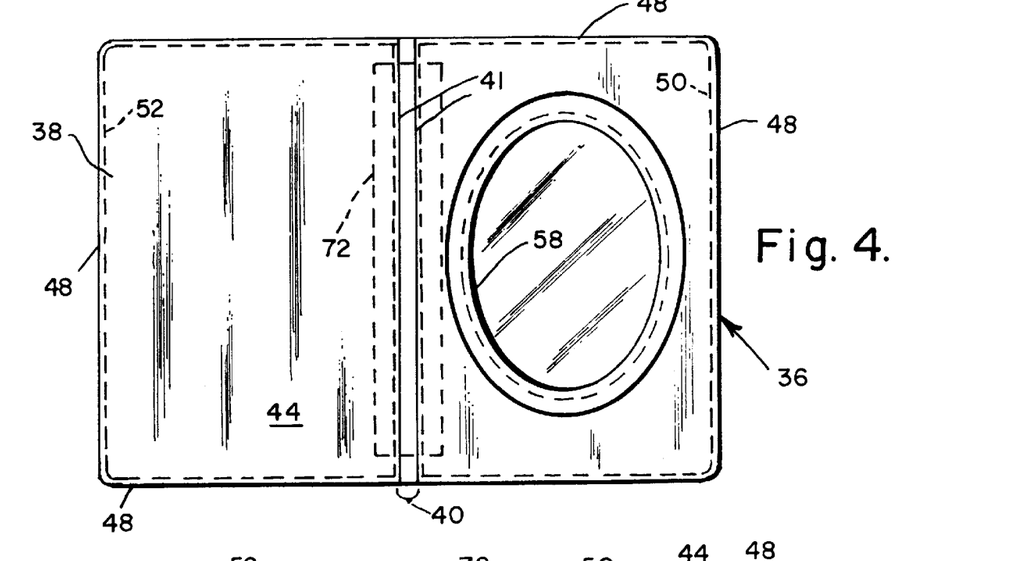
FIG. 4 is an elevation view of the outer surface of the cover included in the album of FIG. 3, showing interior elements (in phantom) of one embodiment of such cover.
Figure 5:
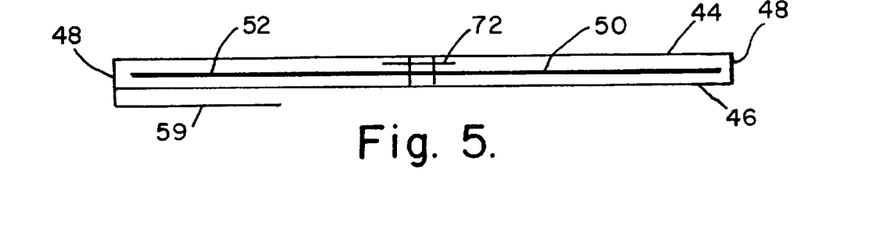
FIG. 5 is a schematic cross-sectional representational diagram of the cover depicted in FIG. 4.

A preferred embodiment of a photo album 36 according to the present invention is shown in FIG. 3 and, as shown also in FIG. 4 and schematically represented in FIG. 5, includes a vinyl-covered cover 38 having a spine 40, and polypropylene pages or leaves 42 thermally welded to the cover structure along the spine 40. Like the album 10 of FIGS. 1 and 2, the cover 38 includes a flexible vinyl outer cover sheet 44 and a flexible vinyl inner cover sheet or liner 46 secured along their edges such as by a welds or heat seals 48 in conventional manner, with two rectangular rigid panels (such as chipboard) 50, 52 between the outer cover sheet 44 and the inner cover sheet 46 forming the front cover 54 and the rear cover 56 separated by the spine 40. The outer cover sheet 44 may include longitudinal bar welds or creases 41 for defining the spine 40, as may the inner cover sheet 46 as appropriate.

The cover 38 may include a window or opening in the front cover 54 for viewing a photograph that may be contained in the first of the album's transparent leaves 42, such as the oval opening 58 through the outer cover sheet 44, the chipboard panel 50 and the inner cover sheet 46, with the cover sheets 44, 46 heat sealed together along the opening 58. The cover 38 may also include a vinyl panel 59 welded along three edges thereof to the inner cover sheet 46 by the heat seals 48, to form a pocket for holding sheet items such as film negative strips corresponding to the photographs to be contained in the album leaves 42 during use.

Figure 6:
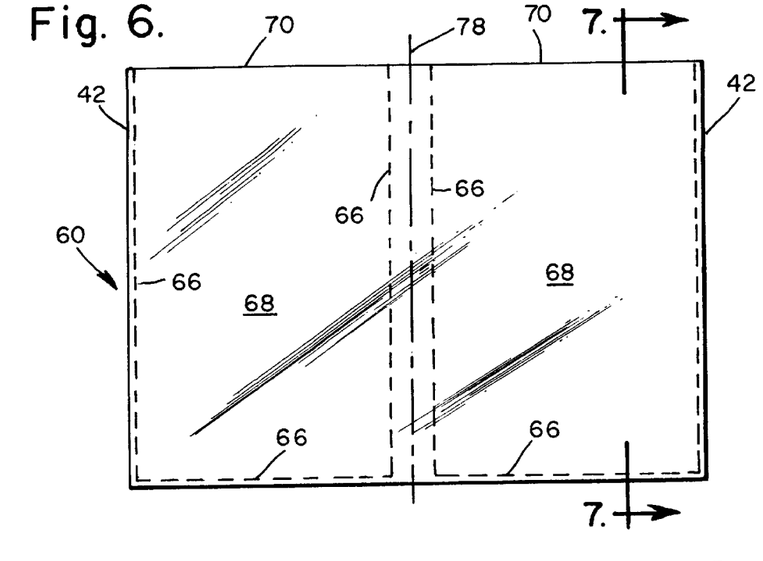
FIG. 6 is an elevation view of a dual-leaf included in the album of FIG. 3.
Figure 7:
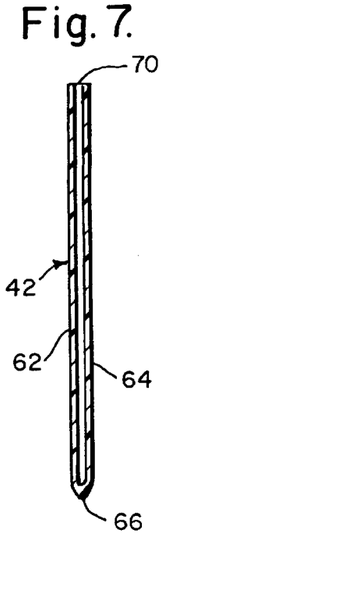
FIG. 7 is a cross-sectional view of one of the leaves of the dual-leaf of FIG. 6 taken along the line 7—7 in the direction of the appended arrows.

The polypropylene leaves 42 for securement to the vinyl-covered album cover 38 of FIGS. 4 and 5 are shown in FIGS. 6 and 7 as a dual-leaf structure 60. Two flexible rectangular polypropylene panels 62, 64 each having a height dimension slightly less than the height of the cover 38 and a width dimension slightly less than the width of the cover 38, are superposed and thermally welded together by heat seams or welds 66 to form two pockets 68 each having an opening 70 for permitting the insertion of a photographic print in each pocket 68, or two prints positioned back-to-back in each pocket 68, although other leaf configurations are possible having multiple pockets for containing additional prints. The polypropylene panels 62, 64 may be thermally welded together by such processes as conventional ultrasonic welding, or by thermocontact welding such as taught in U.S. Pat. No. 5,312,507 incorporated herein by reference.

In accordance with the present invention, the polypropylene leaves 42 are secured to the vinyl-covered cover 38 by thermal welding. Because of the welding incompatibility of polypropylene and vinyl materials, the polypropylene leaves 42 are not reliably thermally weldable to the vinyl inner cover sheet or liner 46, or to the vinyl inner liner 46/vinyl outer cover sheet 44 combination. The present invention permits the fabrication by thermal welding of a photo album having a vinyl cover and polypropylene leaves, by avoiding any welding of the polypropylene leaves to the vinyl inner cover sheet or liner 46 and/or the vinyl outer cover sheet 46. This is accomplished by retaining an intermediate polypropylene sheet between the vinyl inner cover sheet 46 and the vinyl outer cover sheet 44 with a portion of the intermediate sheet extending along the cover's spine 40, with the polypropylene leaves 42 thermally welded to the polypropylene intermediate sheet along such portion and through the vinyl inner cover sheet 46.

Figure 8A:
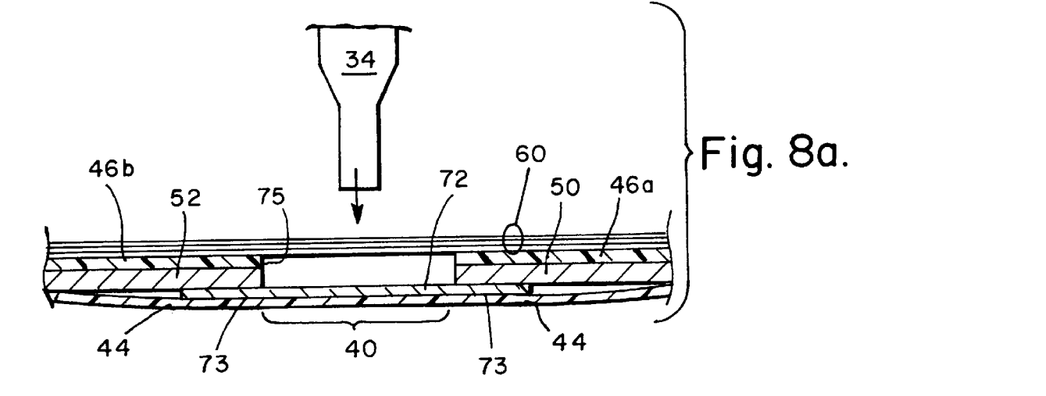
FIGS. 8a and 8b are fragmentary cross-sectional views of a configuration of the album of FIG. 3, in the vicinity of the album's spine area, FIG. 8a representing one manner of fabricating the album and FIG. 8b showing the resulting album.
Figure 8B:
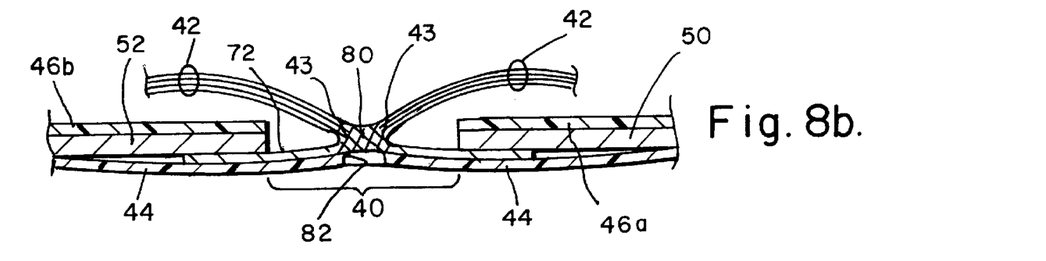

In its preferred embodiments shown in FIGS. 4, 5 and 8–11, the intermediate polypropylene sheet is in the form of a flexible polypropylene strip 72 disposed between the chipboard or other rigid panels 50, 52 and the vinyl outer cover sheet 44, and bridging the spine 40. As shown in the example of FIG. 8 (in which FIG. 8a is a fragmentary cross-sectional view of the open album 36 in the vicinity of the spine area 40 during fabrication prior to welding of the sleeves 42 to the strip 72, and FIG. 8b is the same cross-sectional view after welding), longitudinal edge portions 73 of the polypropylene strip 72 may be simply trapped or captively disposed between portions of the chipboard panels 50, 52 and the vinyl outer cover sheet 44, or the polypropylene strip 72 may be secured along the chipboard panels 50, 52 by being laminated thereto, or by an adhesive such as double-sided adhesive tape strips 74, 76 shown in FIG. 9. In either case, in the configurations shown in FIGS. 8a and 9, the vinyl inner cover sheet 46 is not continuous across the spine area 40, ending along the respective inner edges of the chipboard panels 50, 52 facing the spine 40, i.e. the vinyl inner cover sheet 46 comprises two vinyl sheets 46a, 46b, providing an opening 75 in the vinyl inner cover sheet 76 along the spine 40.

The polypropylene leaves 42 are welded along an edge 43 thereof to the polypropylene strip 72 extending along the spine 40, by a suitable thermoplastic welding operation for welding polypropylene sheet materials, and in this preferred embodiment conventional ultrasonic welding is used such as by application of the ultrasonic horn 34 for welding a stack of the polypropylene dual-leaves 60 along a vertical centerline 78 (FIG. 6) to the polypropylene strip 72 at welds 80. The pressure and energy produced by the ultrasonic horn 34 (operating against the anvil supporting the structure shown in FIG. 8a, not shown) during the welding process may produce deep indentations or apertures 82 (FIG. 8b) in the vinyl outer cover sheet 44 spaced along the spine 40, and the ultrasonic horn pattern is preferably arranged for producing a linear pattern of spaced welds 80 so as to produce a linear pattern of similarly spaced indentations or apertures 82 to preclude degradation of the structural integrity of the vinyl outer cover sheet 44 along the spine 40 (see FIG. 3).

Figure 9:
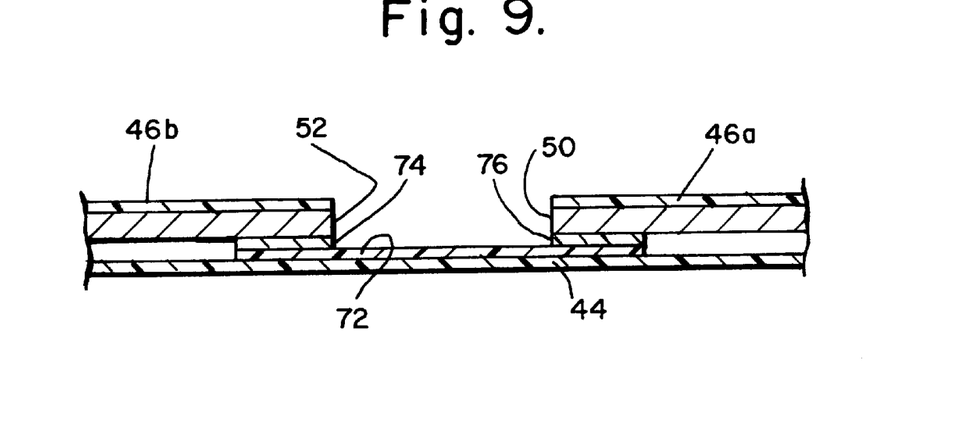
Figure 10A:
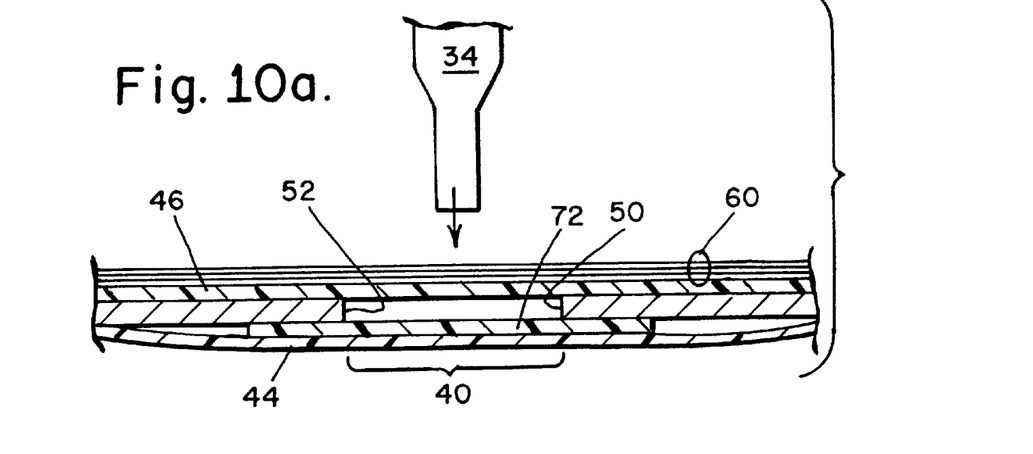
FIGS. 10a and 10b are fragmentary cross-sectional views of another configuration of the album of FIG. 3, in the vicinity of its spine, FIG. 10a representing a variation of the method of fabricating the album and FIG. 10b showing the resulting album.
Figure 10B:
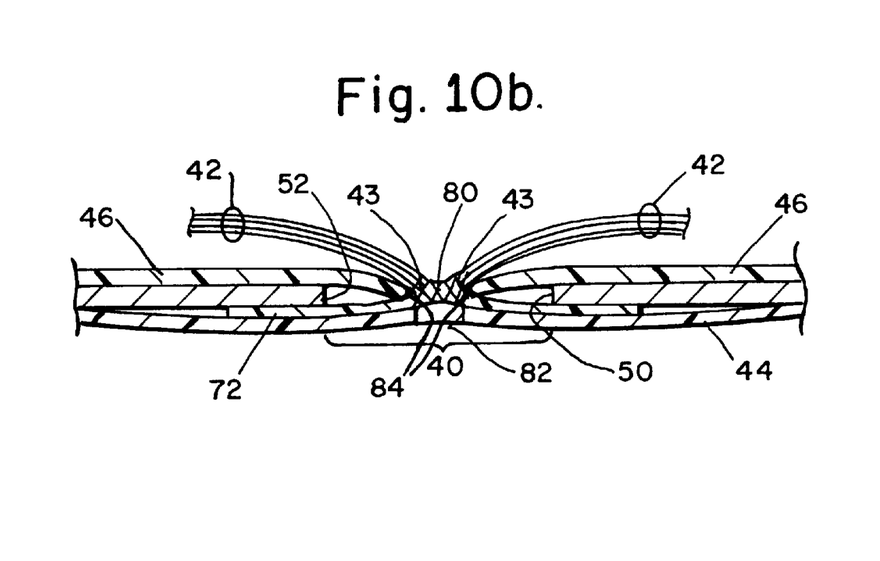

A variation of the preferred album embodiment and its method of fabrication is shown in FIG. 10, representing fragmentary cross-sectional views of the album in the vicinity of the spine 40. In FIG. 10a, which is shown just before welding occurs, the vinyl inner cover sheet or liner 46 is continuous across the spine 40, and the longitudinal end portions 73 of the polypropylene strip 72 are trapped or captively disposed between the chipboard panels 50, 52 and the vinyl outer cover sheet 44 (which may be augmented by adhering the polypropylene strip 72 to the chipboard panels 50, 52 as shown in FIG. 9). During ultrasonic welding, the pressure and energy produced by the ultrasonic horn 34 operating against the anvil (not shown) supporting the structure of FIG. 10a burns through the vinyl inner cover sheet or liner 46, producing openings or apertures 84 therethrough, and causes the stacked polypropylene dual-leaves 60 to contact and weld to the polypropylene strip 72 at welds 80 as shown in FIG. 10b. The ultrasonic welding process may also produce the deep indentations or apertures 82 in the vinyl outer cover sheet 44 along the spine 40, as previously discussed.

Figure 11:
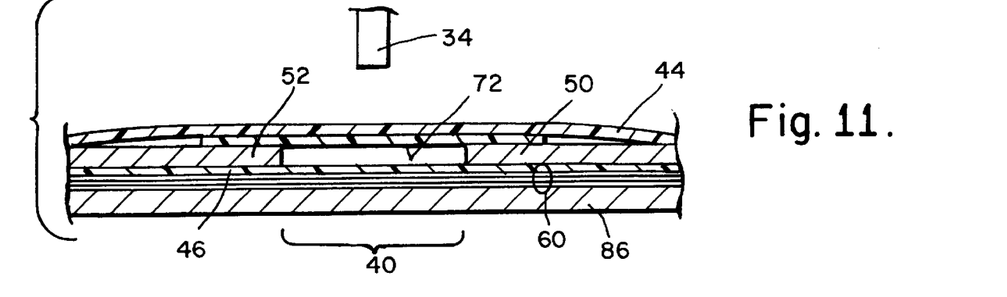
FIG. 11 is a fragmentary cross-sectional view of the album of FIG. 3, in the vicinity of its spine, representing a variation in the method of fabricating the album depicted in FIG. 10b.

In FIG. 11, the welding technique represented in FIG. 10a is shown with the pre-welding structure inverted, i.e. with the polypropylene dual-leaves 60 stacked on the anvil 86 of the ultrasonic apparatus, and the album cover 38 (FIGS. 4 and 5) situated on the polypropylene dual-leaf stack with the vinyl inner cover or liner 46 contacting the uppermost dual-leaf 60, followed by the chipboard panels 50, 52 and the polypropylene strip 72 trapped along its longitudinal edge portions between the chipboard panels 50, 52 and the vinyl outer cover sheet 44. During welding for producing the product shown in FIG. 10b, the pressure and energy produced by the ultrasonic horn 34 operating against the anvil 86 supporting the structure shown in FIG. 11, burns through the vinyl outer cover sheet 44 producing the apertures 82 therethrough, and burns through the vinyl inner cover sheet or liner 46 to produce the openings or apertures 84 along the spine 40 while welding the stack of polypropylene dual-leaves 60 to the polypropylene strip 72 at welds 80 through the openings or apertures 84 in the vinyl inner cover sheet 46. Such inverted arrangement of the album components may also be used in fabricating other album embodiments according to the present invention.

Figure 12:
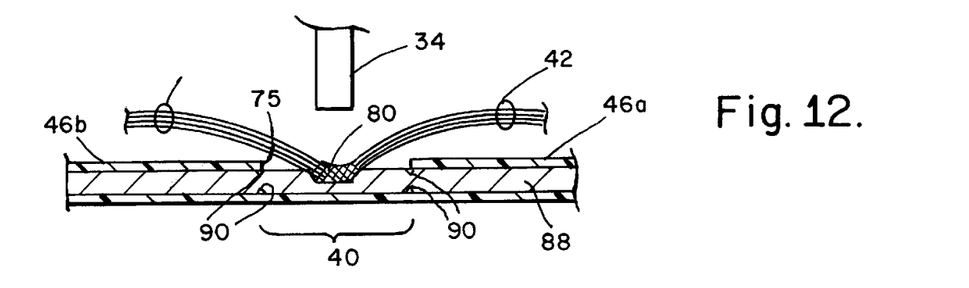
FIG. 12 is a fragmentary cross-sectional view of another embodiment of the album of FIG. 3, in the vicinity of its spine, showing the fabrication method as applied to a variation of the cover and the resulting cover album.

In FIG. 12, another preferred embodiment of the album and fabrication process of the present invention is shown (in fragmentary cross-sectional view in the vicinity of the spine 40), wherein a single rigid polypropylene panel 88 is utilized instead of the two chipboard panels 50, 52 and the polypropylene strip 72 of the embodiment of FIG. 8. The polypropylene panel 88 is scored with score lines or welds 90 for permitting folding along the spine 40. The polypropylene dual-leaves 60 (and hence the polypropylene leaves 42) are ultrasonically welded to the rigid polypropylene panel 88 along the spine 40, upon utilization of the ultrasonic horn 34.

Figure 13A:
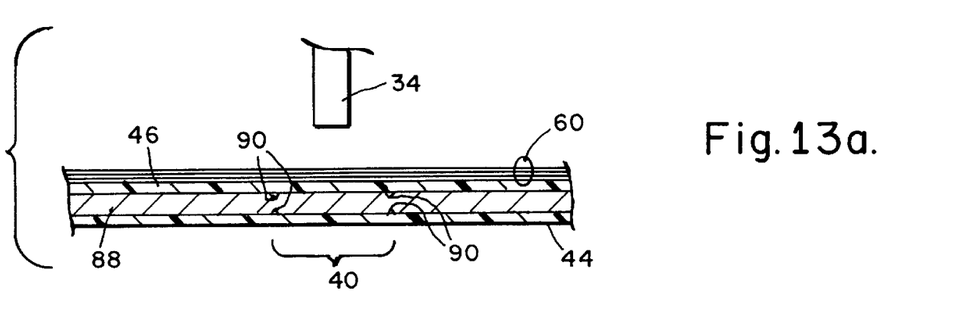
FIGS. 13a and 13b are fragmentary cross-sectional views of a variation of the album embodiment of FIG. 12, in the vicinity of the album's spine, FIG. 13a representing one manner of fabricating the album and FIG. 13b representing the resulting album.
Figure 13B:
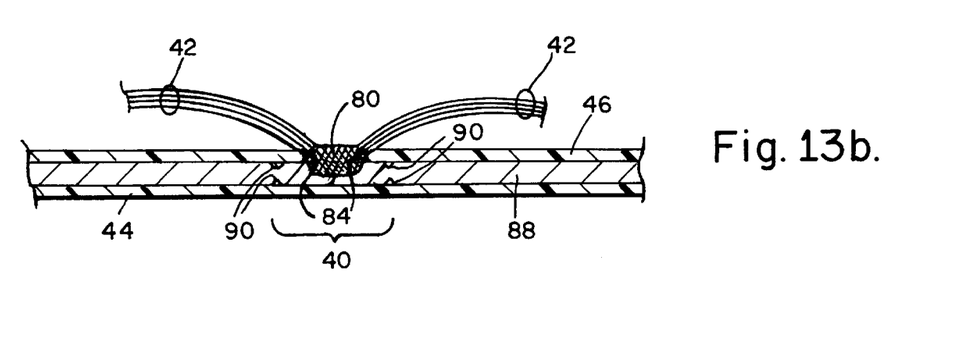

The burn-through fabrication process of FIGS. 10 and 11 is also employed in FIGS. 13a and 13b (which are fragmentary side views in the vicinity of the spine 40), wherein the single rigid polypropylene panel 88 replaces the two chipboard panels 50, 52 and the polypropylene strip 72. As shown in FIG. 13a (before welding), the vinyl inner cover sheet or liner 46 is positioned upon the rigid polypropylene sheet 88 and is continuous across the spine area 40 represented by the scores 90. During ultrasonic welding, the vinyl liner 46 is burned through to produce openings or apertures 84 therein along the spine 40, permitting the polypropylene dual-leaves 60 (and hence the polypropylene leaves 42) to contact and be welded to the rigid polypropylene panel 88, as shown in FIG. 13b.

In one example of a photo album 38 according to the present invention, the album cover 38 was approximately 9 3/8 inches in width and 6 3/4 inches in height, with the spine 40 being approximately 5/16 inch in width; the polypropylene strip 72 was approximately 1 inch in width and 6 1/4 inches in height; the rigid chipboard panels 50, 52 were each approximately 4¹¹⁄₃₂ inches in width and 6½ inches in height, with an approximately ⁷⁄₁₆ inch space in the width dimension between the boards; and the polypropylene dual-leaves 60 were approximately 8⅞ inches in width and 6³⁄₁₆ inches in height with a ½ inch separation in the width dimension between the two pockets 68. The outer cover sheet 44 material was 27.5 gauge expanded vinyl with printed pattern; the inner cover sheet or liner 46 material was 7.8 gauge embossed taffeta vinyl; the rigid boards 50, 52 were 0.035 inch thick chipboard; the strip 72 was 115 micron thick "orange peel" embossed polypropylene; and the leaf material was 45 micron thick clear polypropylene. The polypropylene leaves 46 were welded to the captured polypropylene strip 72 by ultrasonic apparatus manufactured and distributed by Branson Ultrasonics Corporation of Danbury, Conn., which apparatus may also be used for welding the polypropylene leaves 46 to the captured rigid polypropylene panel 88.

Thus, there has been described preferred embodiments of a photograph album and its fabrication process, the album having a vinyl-covered cover and polypropylene leaves, the polypropylene leaves being secured to the vinyl-covered cover by thermally welding the leaves to a polypropylene intermediate sheet or strip captured between the inner and outer cover sheets of the album's cover. Other embodiments of the present invention, and other variations of the embodiments described herein, may be developed without departing from the essential characteristics thereof. For example, although vinyl and polypropylene are described in the disclosed preferred embodiments as the weld-incompatible thermoplastic cover and leaf materials, other weld-incompatible cover and leaf materials may be utilized. In particular, the present album and process are applicable for producing albums with vinyl-covered covers and leaves of other polyolefin materials such as polyethylene. Accordingly, the invention should be limited only by the scope of the claims listed below.

I claim:

1. An album comprising:
   an inner cover sheet of a thermoplastic material and an outer cover sheet of a thermoplastic material secured to one another in superposed relation to form a cover having a spine;
   a plurality of leaves of a thermoplastic material weld-incompatible with the thermoplastic materials of said inner cover sheet and said outer cover sheet; and
   an intermediate sheet of a thermoplastic material weld-compatible with the thermoplastic material of said leaves, said intermediate sheet retained between said inner cover sheet and said outer cover sheet and extending along said spine, said leaves thermally welded to said intermediate sheet along said spine and through said inner cover sheet.

2. The album according to claim 1, wherein:
   the thermoplastic material of said inner cover sheet is vinyl and the thermoplastic material of said outer cover sheet is vinyl; and
   the thermoplastic material of said leaves is polypropylene and the thermoplastic material of said intermediate sheet is polypropylene.

3. The album according to claim 1, wherein:
   said leaves are welded to said intermediate sheet through at least one opening in said inner cover sheet along said spine.

4. The album according to claim 1, wherein:
   said inner cover sheet is not continuous across said spine.

5. The album according to claim 1, wherein:
   said intermediate sheet comprises a rigid panel foldable along said spine.

6. The album according to claim 1, wherein:
   said intermediate sheet comprises a strip longitudinally extending along said spine.

7. The album according to claim 6, wherein:
   said leaves are welded to said strip through at least one opening in said inner cover along said spine.

8. The album according to claim 6, further including:
   a first rigid panel disposed between said inner cover sheet and said outer cover sheet on one side of said spine and a second rigid panel disposed between said inner cover sheet and said outer cover sheet on the other side of said spine.

9. The album according to claim 8, wherein:
   said strip is flexible and includes longitudinal edge portions disposed between portions of said panels and said outer cover sheet.

10. The album according to claim 9, wherein:
    said leaves are welded to said strip through apertures in said inner cover sheet spaced along said spine.

11. The album according to claim 10, wherein:
    the material of said inner cover sheet is vinyl and the material of said outer cover sheet is vinyl; and
    the material of said leaves is polypropylene and the material of said strip is polypropylene.

12. A process for fabricating an album, comprising:
    (a) providing an album cover comprising an inner cover sheet of a thermoplastic material and an outer cover sheet of a thermoplastic material secured to one another in superposed relation forming a front cover and a rear cover separated by a spine, said album cover including an intermediate sheet of a thermoplastic material weld-incompatible with the thermoplastic materials of said inner cover sheet and said outer cover sheet, said intermediate sheet retained between said inner cover sheet and said outer cover sheet and extending along said spine;
    (b) providing a plurality of leaves of a thermoplastic material weld-compatible with the thermoplastic material of said intermediate sheet; and
    (c) thermally welding said leaves to said intermediate sheet along said spine and through said inner cover sheet.

13. The method according to claim 12, wherein:
    in step (a), the thermoplastic material of said inner cover sheet is vinyl, the thermoplastic material of said outer cover sheet is vinyl, and the thermoplastic material of said intermediate sheet is polypropylene; and
    in step (b), the thermoplastic material of said leaves is polypropylene.

14. The process according to claim 12, wherein:
    in step (c), said leaves are welded to said intermediate sheet through at least one opening in said inner cover sheet along said spine.

15. The process according to claim 12, wherein:
    in step (a), said inner cover sheet of said provided album cover is not continuous across said spine.

16. The process according to claim 12, wherein:
    in step (a), said inner cover sheet of said provided album cover is continuous across said spine.

17. The process according to claim 16, wherein:

during step (c), said leaves are welded to said intermediate sheet through apertures burned through said inner cover sheet spaced along said spine.

18. The process according to claim 12, wherein:

in step (a), said intermediate sheet comprises a rigid panel within said first and second covers and foldable along said spine.

19. The process according to claim 12, wherein:

in step (a), said intermediate sheet of said provided album cover is a strip longitudinally extending along said spine.

20. The process according to claim 19, wherein:

in step (a), said provided album cover further includes a first rigid panel disposed between said inner cover sheet and said outer cover sheet on one side of said spine and a second rigid panel disposed between said inner cover sheet and said outer cover sheet on the other side of said spine.

21. The process according to claim 20, wherein:

in step (a), said strip included in said provided album cover is flexible and has longitudinal edge portions disposed between portions of said panels and said outer cover sheet.

22. The process according to claim 21, wherein:

during step (c), said leaves are welded to said strip through apertures burned through said inner cover sheet spaced along said spine.

23. The process according to claim 22, wherein:

in step (a), the thermoplastic material of said inner cover sheet is vinyl, the thermoplastic material of said outer cover sheet is vinyl, and the thermoplastic material of said strip is polypropylene; and in step (b), the thermoplastic material of said provided leaves is polypropylene.

\* \* \* \* \*